United States Patent
El-Azzami et al.

(10) Patent No.: US 12,143,265 B1
(45) Date of Patent: Nov. 12, 2024

(54) MANAGING ENTITLEMENTS FOR DATA PROCESSING SYSTEMS USING OUT OF BAND COMMUNICATION CHANNELS

(71) Applicant: Dell Products L.P., Round Rock, TX (US)

(72) Inventors: Bassem El-Azzami, Austin, TX (US); Richard M. Tonry, Georgetown, TX (US); Abeye Teshome, Austin, TX (US); Mohit Arora, Frisco, TX (US); Vinodkumar Vasudev Ottar, Mckinney, TX (US); Adolfo Sandor Montero, Pflugerville, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/498,263

(22) Filed: Oct. 31, 2023

(51) Int. Cl.
*H04L 41/0806* (2022.01)
(52) U.S. Cl.
CPC ............. *H04L 41/0806* (2013.01)
(58) Field of Classification Search
CPC ............................ H04L 41/0806
See application file for complete search history.

(56) References Cited

U.S. PATENT DOCUMENTS

| | | | |
|---|---|---|---|
| 7,599,907 B2 | 10/2009 | Havewala et al. | |
| 8,020,192 B2 | 9/2011 | Wright et al. | |
| 8,490,163 B1 | 7/2013 | Harsell et al. | |
| 8,850,186 B2 | 9/2014 | Yamauchi | |
| 8,925,028 B2 * | 12/2014 | Talbert | H04H 60/32 725/132 |
| 9,191,781 B2 | 11/2015 | Kumar | |
| 9,246,678 B2 | 1/2016 | Nayshtut et al. | |
| 9,349,009 B2 | 5/2016 | Rivera | |
| 9,721,111 B2 | 8/2017 | Cavanaugh | |
| 9,721,175 B2 | 8/2017 | Kursun et al. | |
| 9,785,491 B2 | 10/2017 | Cilfone et al. | |
| 10,021,669 B2 | 7/2018 | George | |
| 10,163,105 B1 | 12/2018 | Ziraknejad et al. | |
| 10,169,571 B1 | 1/2019 | Attfield et al. | |

(Continued)

FOREIGN PATENT DOCUMENTS

WO  WO-03090107 A1 * 10/2003 ............... G06F 8/61

*Primary Examiner* — Philip C Lee
(74) *Attorney, Agent, or Firm* — Womble Bond Dickinson (US) LLP (57) ABSTRACT

Methods and systems for managing entitlements for data processing systems are disclosed. A management controller for the data processing system may utilize an out of band communication channel to obtain a list of the entitlements for the data processing system from a management server. The management controller may compare the features included in the list of the entitlements to features included in a list of existing enabled features for the data processing system to obtain a difference. The management controller may modify operation of hardware components of the data processing system to resolve the difference. By doing so, the management controller may monitor entitlements for the data processing system, the entitlements being based on user subscriptions for features of the data processing system.

17 Claims, 5 Drawing Sheets

(56) References Cited

U.S. PATENT DOCUMENTS

| | | |
|---|---|---|
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,770,456 B1* | 9/2023 | Patel ............... H04L 67/51 709/223 |
| 2012/0151512 A1* | 6/2012 | Talbert ............ H04H 60/32 725/14 |
| 2012/0246704 A1* | 9/2012 | Dorsey ............ G06F 21/123 726/4 |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2019/0156019 A1 | 5/2019 | Chen |
| 2022/0222328 A1 | 7/2022 | Talib et al. |
| 2023/0222468 A1* | 7/2023 | Wilson ............ G06Q 20/102 705/418 |
| 2023/0222469 A1* | 7/2023 | Wilson ............ G06Q 10/20 705/400 |
| 2023/0229512 A1* | 7/2023 | Sawal ............. G06F 11/3006 |
| 2023/0229516 A1* | 7/2023 | Sawal ............. G06F 9/5055 718/104 |

\* cited by examiner

MANAGING ENTITLEMENTS FOR DATA PROCESSING SYSTEMS USING OUT OF BAND COMMUNICATION CHANNELS

FIELD

Embodiments disclosed herein relate generally to managing data processing systems. More particularly, embodiments disclosed herein relate to systems and methods to manage entitlements for the data processing systems using at least an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services. The computer-implemented services may include any quantity and type of such services.

To provide the computer-implemented services, the data processing systems may need to operate in a predetermined manner conducive to, for example, execution of applications hosted by the data processing systems that provide the computer-implemented services. To execute the applications in a manner consistent with expectations of downstream consumers of the computer-implemented services, a user of the data processing systems may utilize certain functionalities of hardware and/or software components of the data processing system.

Whether a user has access to a feature of a data processing system (e.g., a hardware and/or software functionality) may be determined by a list of entitlements for the data processing system. The list of the entitlements may indicate which features the user has active subscriptions for, the subscriptions being managed by a management server. Specifically, the user may determine that a particular functionality of a hardware component may increase quality of the computer-implemented services for the downstream consumers. To gain access to the feature, the user may interact with the management server to subscribe to the feature.

To interact with the management server, the user may utilize an application hosted by the data processing system and an in band communication channel. If any in band components (e.g., the application, the operating system, the in band communication channel) are compromised, user access to subscribed features may also be compromised. In addition, a malicious entity may gain control of one or more of the in band components and, by manipulation of the in band communication channel and, therefore, interruption of communications to the management server, may utilize features without maintaining corresponding subscriptions. Consequently, disagreements may arise between the list of the entitlements and features available to users. These disagreements may reduce availability of the computer-implemented services to downstream consumers and may negatively impact the user's experience.

To maintain agreement between the list of the entitlements for a data processing system and features available to a user of the data processing system, embodiments disclosed herein relate to methods and systems for managing entitlements using a management controller and an out of band communication channel. The management controller and a network module that manages communication channels for the data processing system may be powered separately from hardware resources of the data processing system. Therefore, the management controller may communicate with the management server to obtain updated lists of the entitlements while the hardware resources of the data processing system are unpowered. Consequently, the management controller may also maintain communication capabilities in the event of compromise of one or more in band components of the data processing system.

Specifically, the management controller may identify a list of entitlements provided by a management server via the out of band communication channel. The management controller may also manage enablement and/or disablement of features of the data processing system based on the list of entitlements. By doing so, subscription-based features of the data processing system may be maintained and verified using the management controller and the out of band communication channel.

In an embodiment, a method of managing data processing systems is provided. The method may include: making an identification, by a management controller of a data processing system of the data processing systems, of a list of entitlements for the data processing system based on user subscriptions, the list of the entitlements comprising a list of enabled features for the data processing system and the list of the entitlements having been obtained, at least in part, using an out of band communication channel between the management controller and a management server through which a user of the data processing system manages the user subscriptions; making a determination, based on the identification and by the management controller, regarding whether existing enabled features for the data processing system match the list of the entitlements; and in a first instance of the determination in which the existing enabled features for the data processing system do not match the list of the entitlements: performing, by the management controller, an action set to resolve a difference between the existing enabled features and the list of the entitlements.

The existing enabled features may include: a functionality of a hardware component of hardware resources of the data processing system; and a functionality of a software component hosted by the hardware resources.

The existing enabled features may be usable by the user of the data processing system, and the hardware component may have at least a second functionality that is not part of the existing enabled features.

Performing the action set may include modifying operation of the hardware component to provide the user use of the second functionality to resolve the difference.

The data processing system may include a network module adapted to separately advertise network endpoints for the management controller and the hardware resources, the network endpoints being usable by the storage system to address communications to the hardware resources and the management controller.

The management controller and the network module may be on separate power domains from the hardware resources so that the management controller and the network module are operable while the hardware resources are inoperable.

At least a portion of the list of the entitlements may be obtained while the hardware resources are inoperable due to being unpowered.

The out of band communication channel may run through the network module, and an in band communication channel that services the hardware resources may also run through the network module.

The management controller may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1A:
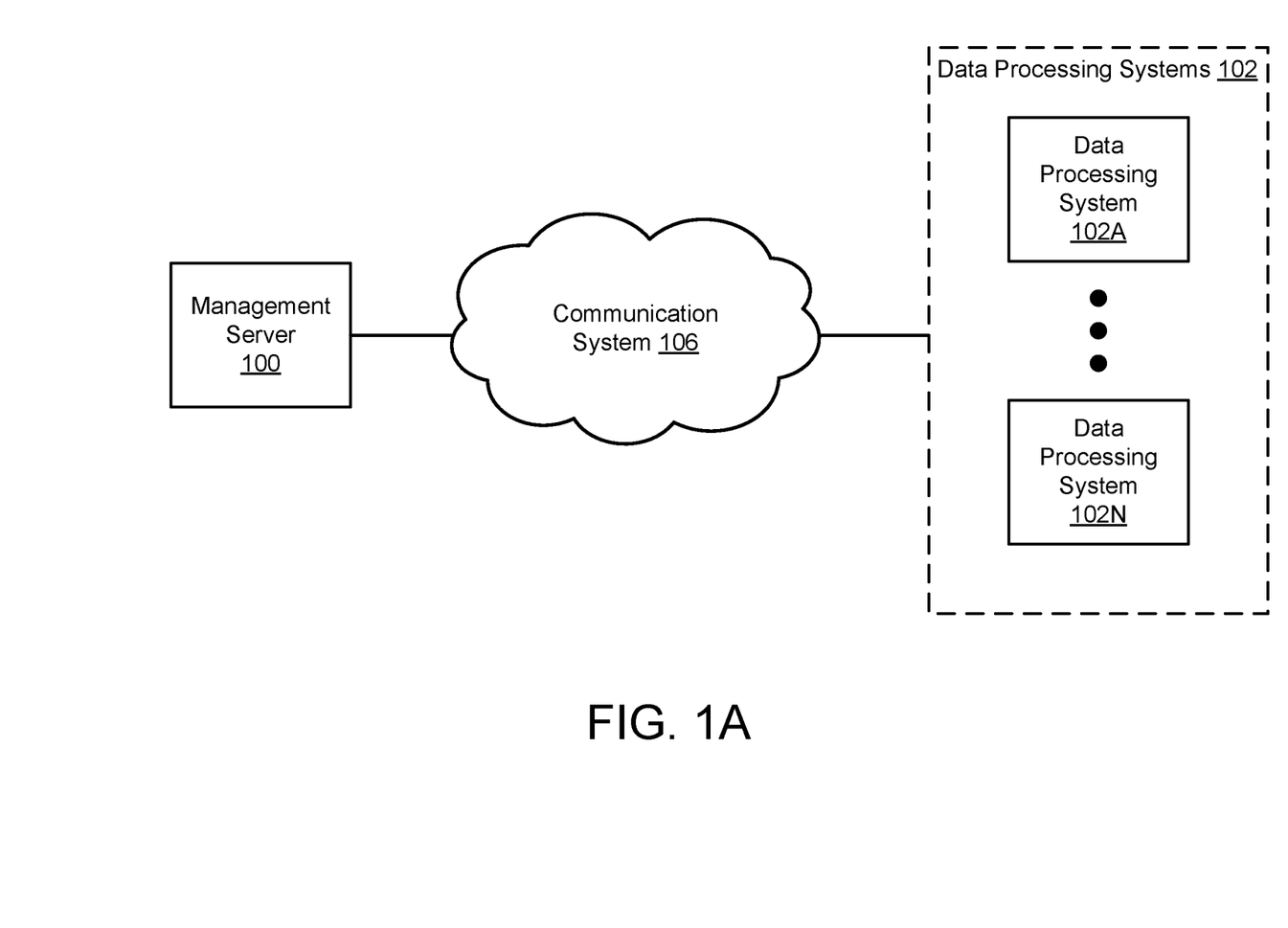
FIG. 1A shows a block diagram illustrating a system in accordance with an embodiment.
Figure 1B:
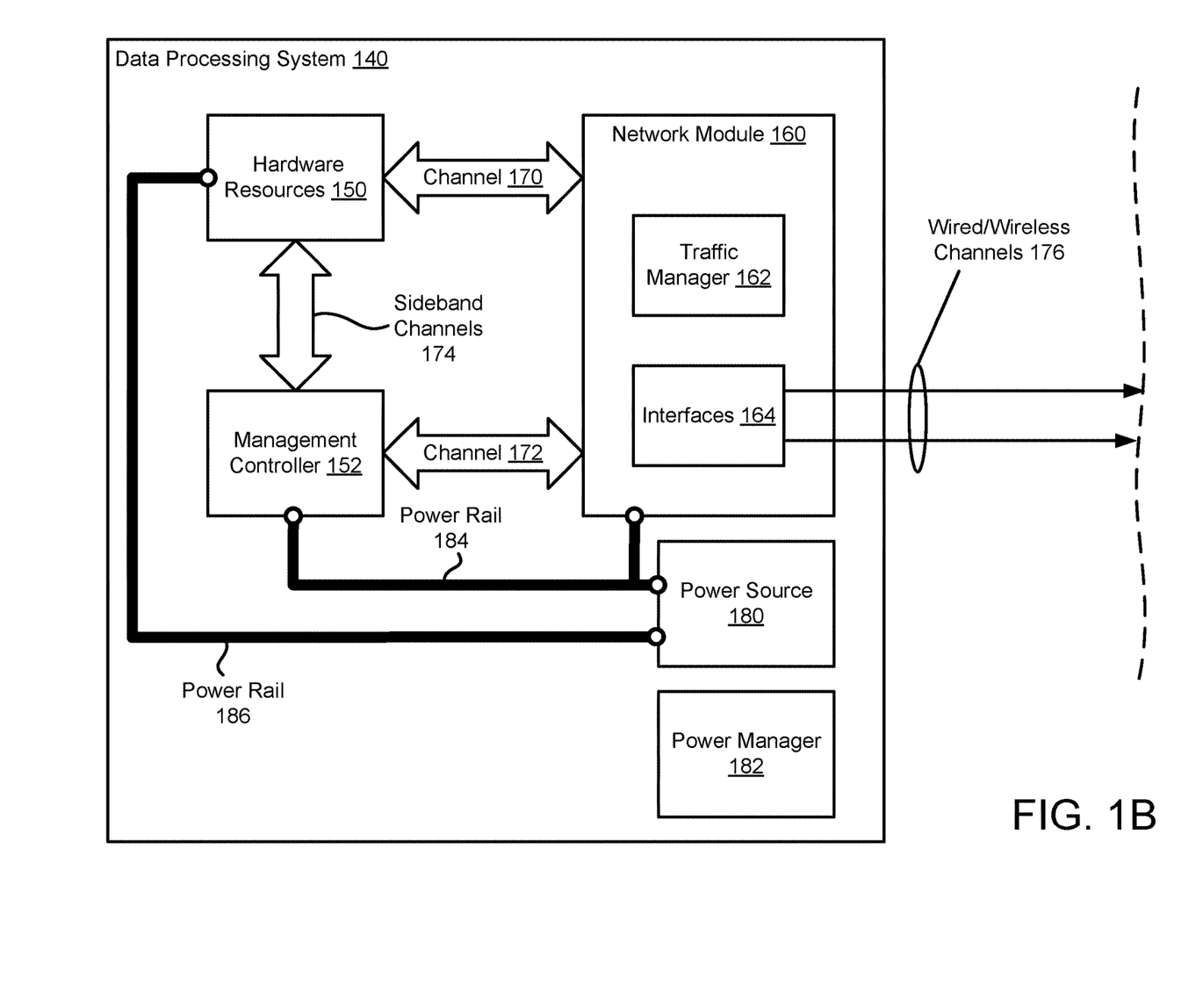
FIG. 1B shows a block diagram illustrating a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, management server 100, data processing systems 102 and/or any other type of devices (not shown in FIG. 1A). Other types of computer-implemented services may be provided by the system shown in FIG. 1A without departing from embodiments disclosed herein.

To provide the aforementioned computer-implemented services, any of data processing systems 102 (e.g., 102A, 102N) may need to operate in a predetermined manner. For example, certain hardware components and/or software components may need to be operational for data processing systems 102 to provide a desired type and/or quantity of computer-implemented services. Different entitlements (e.g., enabled functionalities) of the hardware components and/or software components may be implemented by data processing systems 102 depending on the type and/or quantity of computer-implemented services desired to be provided by the respective data processing systems 102. To enable the functionalities, a user may subscribe to the features via communications to management server 100.

For example, a data processing system may be deployed for use by a user to perform a first type of the computer-implemented services. The user may communicate with the management server to subscribe to a list of features for the first data processing system and a list of entitlements may be issued to the first data processing system based on the list of the features.

Over time, the user may determine that additional features may improve the first type of the computer-implemented service (and/or may determine that a second type of the computer-implemented services is to be provided). The user may communicate with the management server to add subscriptions to the additional features. Upon updating the list of the entitlements, the management server may provide the updated list of the entitlements to the data processing system to modify available features of the data processing system.

The user may subscribe to the features and may enable the features using an application of an operating system of the data processing system. In addition, an in band communication channel may be utilized to communicate with the management server and in band components (e.g., an agent hosted by hardware components of the data processing system) may be responsible for maintaining entitlements based on subscribed features.

In the event of compromise of an in band component and/or the in band communication channel, any number of other in band components may be vulnerable to attack by a malicious entity. Specifically, the malicious entity may enable features for which the user does not have an active subscription and/or may disable features for which the user has an active subscription. In addition, communications between the data processing system and the management server may be interrupted and, therefore, updates to the list of the entitlements may not be implemented for the data processing system over time.

In general, embodiments disclosed herein relate to systems, devices, and methods for managing entitlements for data processing systems 102. To do so, a management controller of a data processing system of data processing systems 102 (e.g., 102A) may utilize a separate power domain and an out of band communication channel to obtain a list of the entitlements from management server 100. This may be performed while hardware resources of data processing system 102A are unpowered. Therefore, the management controller may identify user subscriptions for the data processing system and may enable and/or disable features of the data processing system based on the subscriptions.

Management server 100 may be implemented using a physical device that provides user subscription services (e.g., interaction with users to manage subscriptions for features of data processing systems). Users may request subscription services, for example, through communication between data processing systems 102 and management server 100 (e.g., via communication system 106). Management server 100 may obtain requests for subscriptions and may service the requests by issuing lists of entitlements to the users based on the subscriptions. In addition, management server 100 may be in communication with any of data processing systems 102 via communication system 106 (discussed in more detail in FIG. 1B with reference to in band and out of band communication channels) to verify existing subscriptions for users of data processing systems.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and management server 100).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

Management controller 152 may obtain a list of entitlements for data processing system 140 using channel 172 following identification of an update to user subscriptions for data processing system 140 (and/or for other reasons including, for example, according to a recurring schedule for monitoring updates to the list of the entitlements). Management controller 152 may obtain the list of the entitlements and may manage (directly and/or indirectly) enablement of features included in the list of the entitlements by hardware resources 150.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To provide its functionality, management controller 152 may: (i) make an identification of a list of entitlements for data processing system 140 based on user subscriptions, the list of the entitlements including a list of enabled features for data processing system 140, and/or (ii) may determine whether existing enabled features for data processing system 140 match the list of the entitlements. If the existing enabled features do not match the list of the entitlements, management controller 152 may perform an action set to resolve a difference between the existing enabled features and the list of the entitlements.

The list of the entitlements may be identified through interaction with a management server (e.g., management server 100 described in FIG. 1A) through which a user of data processing system 140 manages the user subscriptions. In addition, the list of the entitlements may be identified using an out of band communication channel between management controller 152 and the management server. The list of the enabled features may include: (i) a functionality of a hardware component of hardware resources 150, and/or (ii) a feature of a software component hosted by hardware resources 150.

Performing the action set may include modifying operation of hardware components of the hardware resources thereby either enabling or disabling features of the data processing system.

Figure 2:
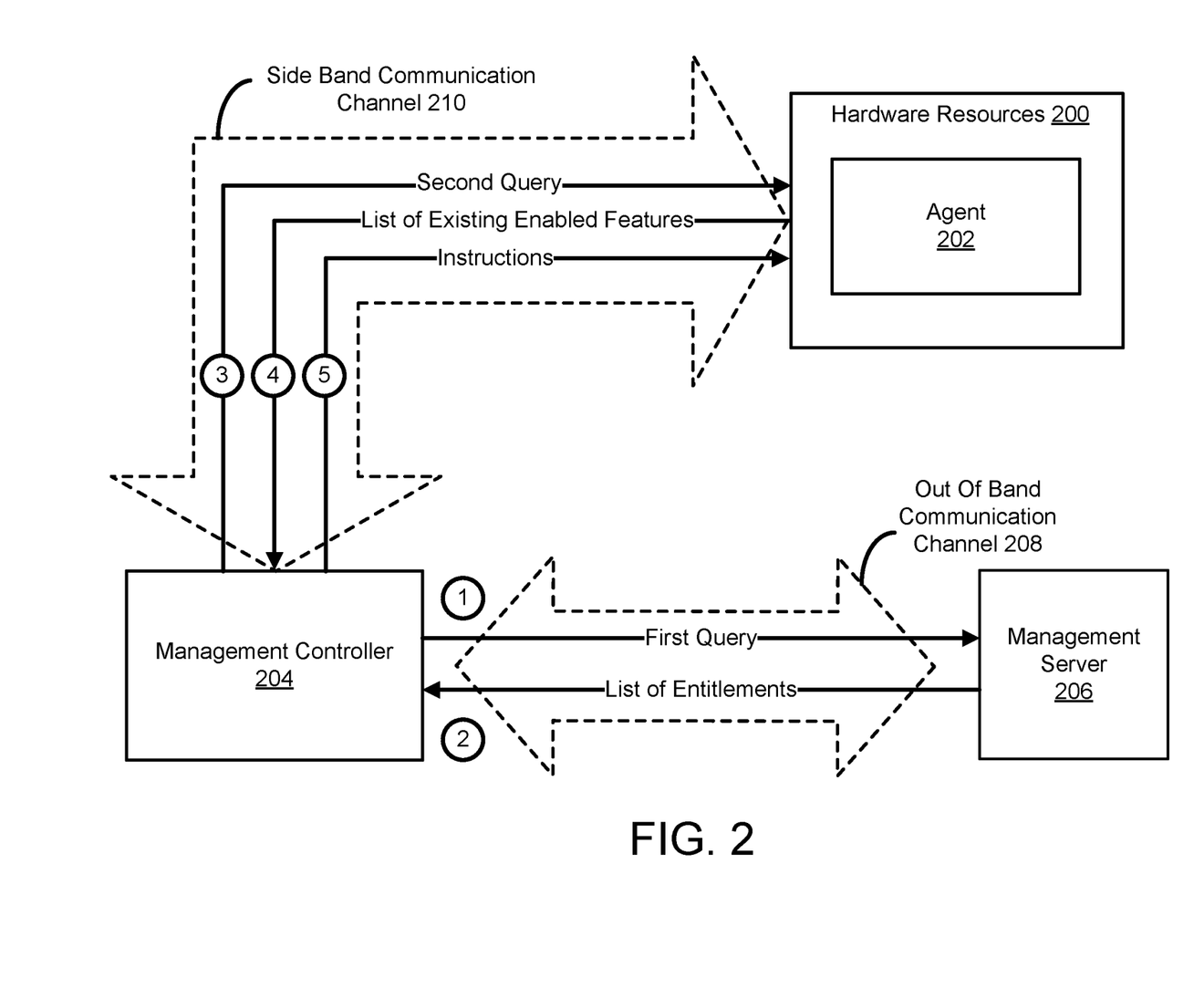
FIG. 2 shows a data flow diagram illustrating a management controller interacting with a management server and hardware resources in accordance with an embodiment.
Figure 3:
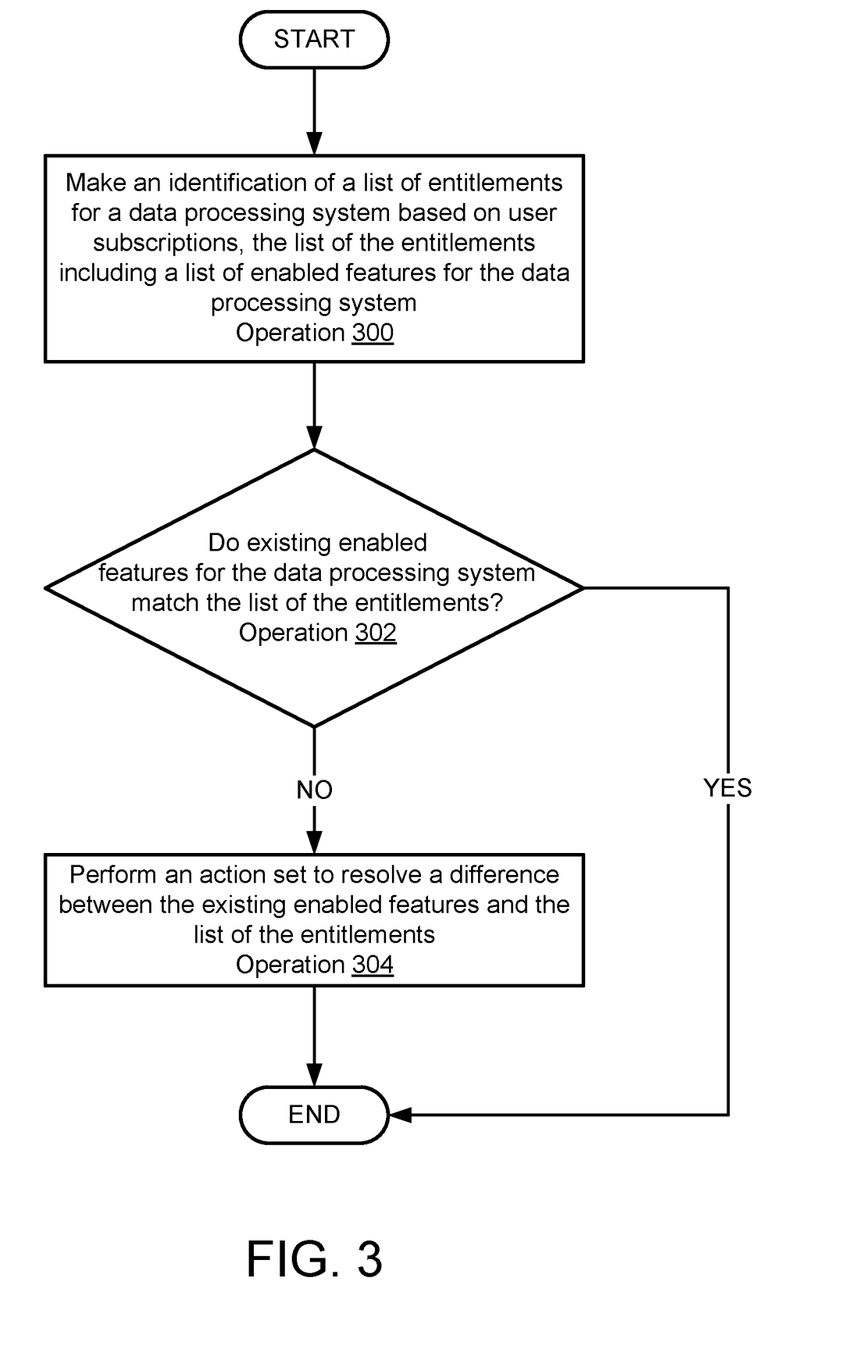
FIG. 3 shows a flow diagram illustrating a method of managing entitlements for a data processing system in accordance with an embodiment.

When providing its functionality, management controller 152 may perform all, or a portion, of the methods and operations illustrated in FIGS. 2-3.

While illustrated in FIG. 1B with a limited number of specific components, a system may include additional, fewer, and/or different components without departing from embodiments disclosed herein.

As discussed above, the components of FIGS. 1A-1B may perform various methods to manage update events for data processing systems that perform computer-implemented services. FIGS. 2-3 may illustrate examples of methods that may be performed by the components of FIGS. 1A-1B. For example, a management controller similar to management controller 152 may perform all or a portion of the methods. In the diagrams discussed below and shown in FIGS. 2-3, any of the operations may be repeated, performed in different orders, and/or performed in parallel with or in a partially overlapping in time manner with other operations.

FIG. 2 shows a data flow diagram illustrating a management controller interacting with a management server and hardware resources in accordance with an embodiment. The data flow diagram may illustrate management of entitlements for a data processing system similar to data processing system 140 described in FIG. 1B.

In FIG. 2, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

At time point one (1) management controller 204 may provide a first query to management server 206. Management server 206 may be similar to management server 100 described in FIG. 1A and management controller 204 may be similar to management controller 152 described in FIG.

1B. The first query may include a request for a list of entitlements for the data processing system, the list of entitlements being maintained by management server 206 and being based on user subscriptions. The first query may be provided to management server 206 via out of band communication channel 208. Doing so may not require any in band components of the data processing system (e.g., hardware resources 200) to be powered. Refer to FIG. 1B for additional details regarding out of band communication channels.

The first query may be provided to management server 206 in response to an event (compromise of one or more components of the data processing system) and/or according to a recurring schedule (e.g., once per day).

In response to the first query, management server 206 may provide a list of entitlements to management controller 204 at time point two (2) via out of band communication channel 208. The list of the entitlements may be based on user subscriptions and may include a list of enabled features for the data processing system.

The user (e.g., a user of the data processing system) may interact with management server 206 to subscribe to features for the data processing system. Enabled features for the data processing system may include: (i) a functionality of a hardware component of hardware resources of the data processing system, (ii) a functionality of a software component hosted by the hardware resources, and/or (iii) other features.

For example, a user may choose to subscribe to a location tracking feature for the data processing system (e.g., a device). The location tracking feature may include hardware and software functionalities previously disabled for the hardware resources of the device. Specifically, the device may have the capability to perform location tracking, but the location tracking feature may not be available to a user of the device due to the user not having an active subscription for location tracking. Upon subscribing to location tracking, hardware circuitry and software capable of capturing and reporting location information may be enabled through an interaction of management controller 204 and hardware resources 200.

Other examples of features a user may subscribe to may include: (i) a central processing unit clock speed increase, (ii) a fast charging software capability, (iii) a software capability for reporting system telemetry data, and/or (iv) other features.

Therefore, the list of the entitlements provided by management server 206 may include a list of features for which the user has an active subscription. The first query may have also indicated identifying information for the user, which may be usable by management server 206 to identify the list of the entitlements.

At time point three (3), management controller 204 may provide a second query to hardware resources 200 via side band communication channel 210. Hardware resources 200 may be similar to any of hardware resources 150 described in FIG. 1B. The second query may be directed to any portion of hardware resources 200 including storage components of hardware resources 200, agent 202 hosted by hardware resources 200, and/or other components. Agent 202 may include software with instructions to receive and execute commands for enabling and/or disabling features of hardware resources 200 and software hosted by hardware resources 200.

The second query may include a request for a list of existing enabled features for the data processing system. The existing enabled features may include: (i) a functionality of a hardware component of hardware resources 200 that is currently usable by the user, and/or (ii) a functionality of a software component hosted by hardware resources 200 that is currently usable by the user.

At time point four (4) agent 202 (and/or other components of hardware resources 200) may provide a list of existing enabled features to management controller 204 via side band communication channel 210.

Consider a scenario in which the user has subscribed to a first feature that the user did not previously have an active subscription for. The list of the entitlements provided by management server 206 may, therefore, indicate an active subscription for the first feature that is not included in the list of the existing enabled features. Hardware components 200 may, therefore, have at least a second functionality that is not part of the existing enabled features.

Specifically, the user may have active subscriptions for a fast charging software feature and a location tracking feature. The user may have recently added the subscription for the location tracking feature and, therefore, the list of the existing enabled features may not include location tracking.

Management controller 204 may compare the list of the entitlements from management server 206 to the list of the existing enabled features from agent 202 to obtain a difference. At time point five (5) management controller 204 may provide instructions to hardware components 200 via side band communication channel 210. The instruction may include a list of commands for which features of hardware resources 200 and/or software hosted by hardware resources should be enabled based on the difference.

Continuing with the above example, the instructions may include commands to enable hardware circuitry for location tracking and commands to enable software capable of capturing and reporting location information. Management controller 204 may directly and/or indirectly manage enablement and/or disablement of features. For example, management controller 204 may interact with a startup agent (e.g., a basic input/output system) hosted by hardware components 200 to enable hardware features for the data processing system. In addition, management controller 204 may modify portions of data stored by storage components of hardware resources 200 to enable software features hosted by hardware components 200. Management controller 204 may also instruct any other entity (e.g., agent 202) to enable and/or disable features.

By doing so, management controller 204 may monitor enabled features of the data processing system and may communicate with management server 206 via out of band communication channel 208 to ensure agreement between existing user subscriptions and existing enabled features for the data processing system.

In an embodiment, the one or more entities performing the operations shown in FIG. 2 are implemented using a processor adapted to execute computing code stored on a persistent storage that when executed by the processor performs the functionality of the system of FIGS. 1A-1B discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1A may perform various methods to manage data processing systems. FIG. 3 illustrates methods that may be performed by the components of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing entitlements for a data processing system in accordance with an embodiment is shown. The method may be performed, for example, by a management controller, and/or any other entity.

At operation 300, an identification may be made of a list of entitlements for a data processing system based on user subscriptions, the list of the entitlements including a list of enabled features for the data processing system. Making the identification may include: (i) providing a request to a management server (and/or other entity) and receiving the list of the entitlements from the management server in response to the request, (ii) reading the list of the entitlements from storage, (iii) generating the list of the entitlements, and/or (iv) other methods.

Providing the request to the management server may include transmitting a message over an out of band communication channel, the message including the request. Receiving the list of the entitlements may include receiving, via a network endpoint managed by a network module of the data processing system for the out of band communication channel, a message from the management server and/or other entity.

At operation 302, it may be determined whether existing enabled features for the data processing system match the list of the entitlements. Determining whether the existing enabled features for the data processing system match the list of the entitlements may include: (i) obtaining a list of the existing enabled features, (ii) obtaining the list of the entitlements, (iii) comparing features included in the list of the existing enabled features to features included in the list of the entitlements to identify a difference between the features included in the list of the existing enabled features and the features included in the list of the entitlements, and/or (v) other methods.

Obtaining the list of the existing enabled features may include: (i) reading the list of the existing enabled features from storage, (ii) querying hardware resources of the data processing system (e.g., via transmitting a request over a side band communication channel) for the list of the existing enabled features, (iii) obtaining the list of the existing enabled features from another entity, (iv) generating the list of the existing enabled features, and/or (v) other methods.

For example, the list of the entitlements may include at least a first feature (e.g., a first functionality of hardware components of the data processing system) and a second feature (e.g., a second functionality of the hardware components of the data processing system). A user of the data processing system may have active subscriptions for the first feature and the second feature. The user may have recently subscribed to the second feature and, therefore, the list of the existing enabled features may not include the second feature. Consequently, obtaining the difference may include identifying that the second functionality is not included in the list of the existing enabled features.

If the existing enabled features for the data processing system match the list of the entitlements, the method may end following operation 302. If the existing enabled features do not match the list of the entitlements, the method may proceed to operation 304.

At operation 304, an action set may be performed to resolve a difference between the list of the existing enabled features and the list of the entitlements. Performing the action set may include modifying operation of the hardware component to provide the user use of the second functionality to resolve the difference. Modifying operation of the hardware component may include: (i) providing instructions to an entity hosted by the hardware resources using a side band communication channel, the instructions indicating that the second functionality is to be enabled, (ii) directly modifying operation of the hardware resources to enable to second functionality, and/or (iii) other methods.

For example, modifying operation of the hardware component to enable the second functionality may include: (i) corresponding with a startup agent (e.g., a basic input/output system) to identify the hardware component for enablement during startup of the data processing system, (ii) modifying a data structure from a storage component of the hardware resources to enable use of a software component hosted by the hardware component, (iii) providing instructions to another entity (e.g., an agent) hosted by the hardware resources indicating that the hardware component is to be enabled, and/or (iv) other methods.

The method may end following operation 304.

Figure 4:
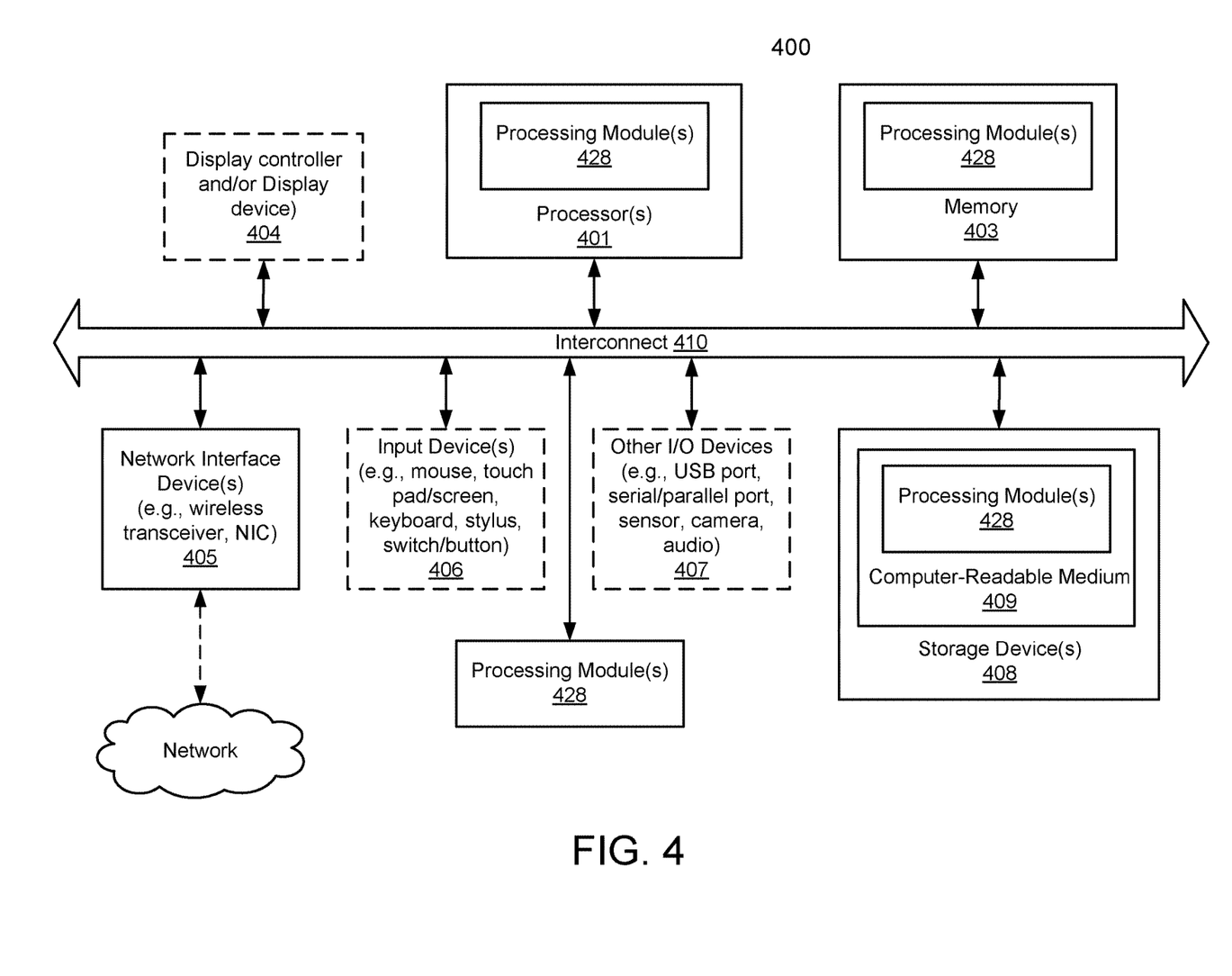
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
   making an identification, by a management controller of a data processing system of the data processing systems, of a list of entitlements for the data processing system based on user subscriptions, the list of the entitlements comprising a list of enabled features for the data processing system and the list of the entitlements having been obtained, at least in part, using an out of band communication channel between the management controller and a management server through which a user of the data processing system manages the user subscriptions;
   making a determination, based on the identification and by the management controller, regarding whether existing enabled features for the data processing system match the list of the entitlements; and
   in a first instance of the determination in which the existing enabled features for the data processing system do not match the list of the entitlements:
      performing, by the management controller, an action set to resolve a difference between the existing enabled features and the list of the entitlements,
   wherein the data processing system comprises a network module adapted to separately advertise network endpoints for the management controller and hardware resources of the data processing system, the network endpoints being usable by the management server to address communications to the hardware resources and the management controller.

2. The method of claim 1, wherein the existing enabled features comprise:
   a functionality of a hardware component of the hardware resources of the data processing system; and
   a functionality of a software component hosted by the hardware resources.

3. The method of claim 2, wherein the existing enabled features are usable by the user of the data processing system, and the hardware component having at least a second functionality that is not part of the existing enabled features.

4. The method of claim 3, wherein performing the action set comprises modifying operation of the hardware component to provide the user use of the second functionality to resolve the difference.

5. The method of claim 1, wherein the management controller and the network module are on separate power domains from the hardware resources so that the management controller and the network module are operable while the hardware resources are inoperable.

6. The method of claim 5, wherein at least a portion of the list of the entitlements is obtained while the hardware resources are inoperable due to being unpowered.

7. The method of claim 1, wherein the out of band communication channel runs through the network module, and an in band communication channel that services the hardware resources also runs through the network module.

8. The method of claim 1, wherein the management controller hosts a transmission control protocol/internet protocol (TCP/IP) stack to facilitate network communications via the out of band communication channel.

9. A non-transitory machine-readable medium having instructions stored therein, which when executed by a processor, cause the processor to perform operations for managing data processing systems, the operations comprising:
   making an identification, by a management controller of a data processing system of the data processing systems, of a list of entitlements for the data processing system based on user subscriptions, the list of the entitlements comprising a list of enabled features for the data processing system and the list of the entitlements having been obtained, at least in part, using an out of band communication channel between the management controller and a management server through which a user of the data processing system manages the user subscriptions;
   making a determination, based on the identification and by the management controller, regarding whether existing enabled features for the data processing system match the list of the entitlements; and
   in a first instance of the determination in which the existing enabled features for the data processing system do not match the list of the entitlements:
      performing, by the management controller, an action set to resolve a difference between the existing enabled features and the list of the entitlements,
   wherein the data processing system comprises a network module adapted to separately advertise network endpoints for the management controller and hardware resources of the data processing system, the network endpoints being usable by the management server to address communications to the hardware resources and the management controller.

10. The non-transitory machine-readable medium of claim 9, wherein the existing enabled features comprise:
    a functionality of a hardware component of the hardware resources of the data processing system; and
    a functionality of a software component hosted by the hardware resources.

11. The non-transitory machine-readable medium of claim 10, wherein the existing enabled features are usable by the user of the data processing system, and the hardware component having at least a second functionality that is not part of the existing enabled features.

12. The non-transitory machine-readable medium of claim 11, wherein performing the action set comprises modifying operation of the hardware component to provide the user use of the second functionality to resolve the difference.

13. The non-transitory machine-readable medium of claim 9, wherein the management controller and the network module are on separate power domains from the hardware resources so that the management controller and the network module are operable while the hardware resources are inoperable.

14. A data processing system, comprising:
    a processor;
    a memory coupled to the processor to store instructions, which when executed by the processor, cause the processor to perform operations for managing data processing systems, the operations comprising:
       making an identification, by a management controller of a data processing system of the data processing systems, of a list of entitlements for the data processing system based on user subscriptions, the list of the entitlements comprising a list of enabled features for the data processing system and the list of the entitlements having been obtained, at least in part, using an out of band communication channel between the management controller and a management server through which a user of the data processing system manages the user subscriptions;

making a determination, based on the identification and by the management controller, regarding whether existing enabled features for the data processing system match the list of the entitlements; and in a first instance of the determination in which the existing enabled features for the data processing system do not match the list of the entitlements:

performing, by the management controller, an action set to resolve a difference between the existing enabled features and the list of the entitlements; and a network module adapted to separately advertise network endpoints for the management controller and hardware resources of the data processing system, the network endpoints being usable by the management server to address communications to the hardware resources and the management controller.

15. The data processing system of claim 14, wherein the existing enabled features comprise:
   a functionality of a hardware component of the hardware resources of the data processing system; and
   a functionality of a software component hosted by the hardware resources.

16. The data processing system of claim 15, wherein the existing enabled features are usable by the user of the data processing system, and the hardware component having at least a second functionality that is not part of the existing enabled features.

17. The data processing system of claim 16, wherein performing the action set comprises modifying operation of the hardware component to provide the user use of the second functionality to resolve the difference.

* * * * *